Feb. 8, 1944.　　　A. L. PARKER　　　2,341,330
DISTRIBUTING VALVE
Filed Feb. 7, 1940　　　3 Sheets-Sheet 1
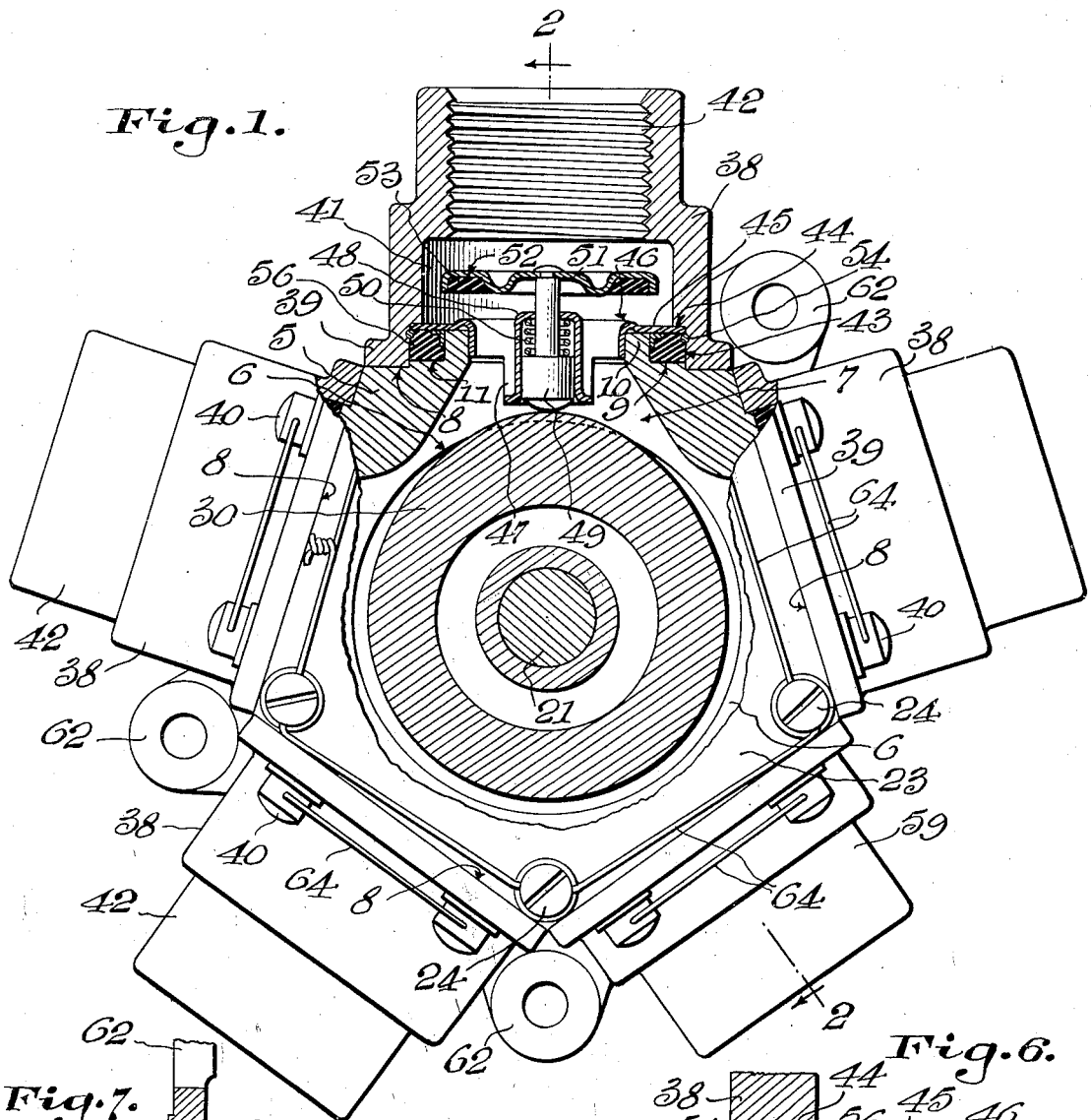
Fig.1.
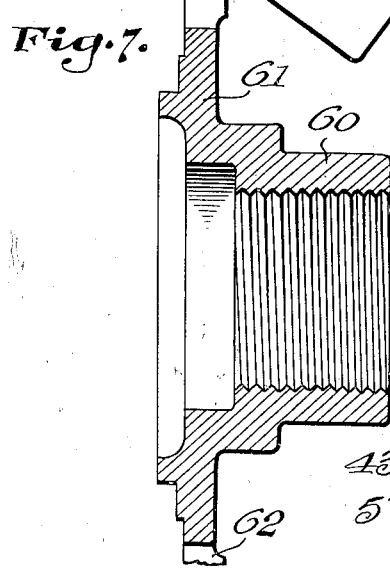
Fig.7.
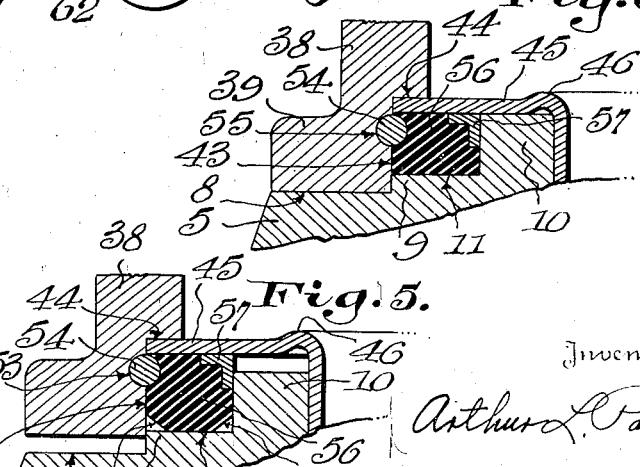
Fig.6.
Fig.5.
Inventor
Arthur L. Parker
By Mason & Porter
Attorneys Feb. 8, 1944. A. L. PARKER 2,341,330
DISTRIBUTING VALVE
Filed Feb. 7, 1940 3 Sheets-Sheet 2

Inventor
Arthur L. Parker
Mason & Porter
Attorneys

Feb. 8, 1944.  A. L. PARKER  2,341,330
DISTRIBUTING VALVE
Filed Feb. 7, 1940  3 Sheets-Sheet 3
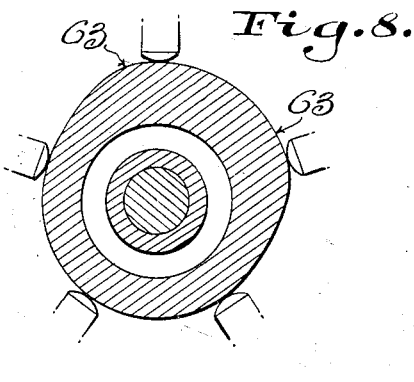
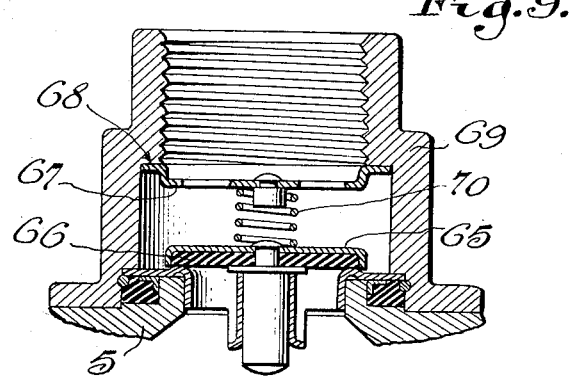
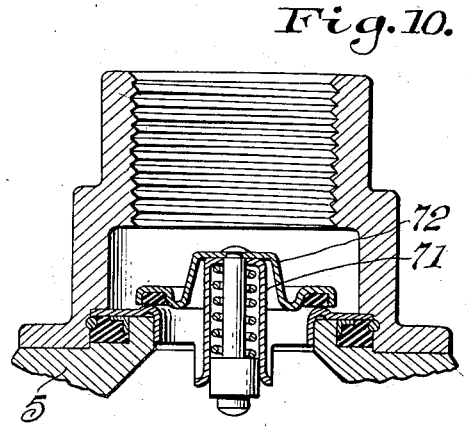
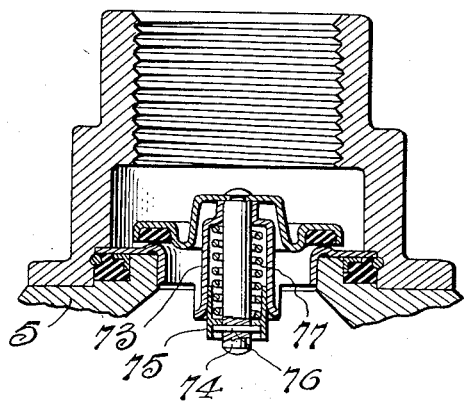
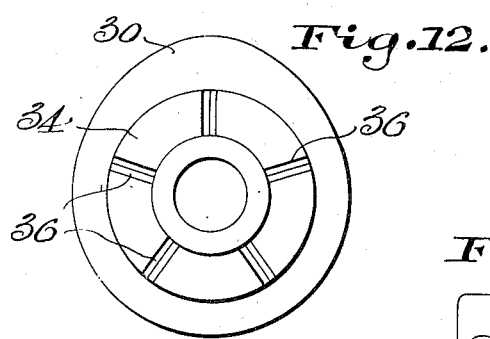
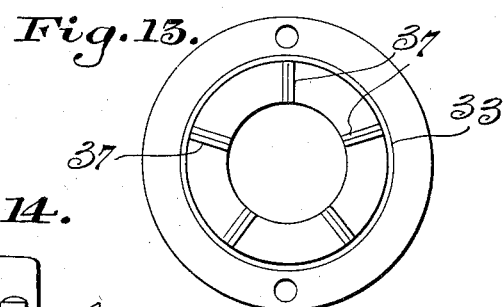
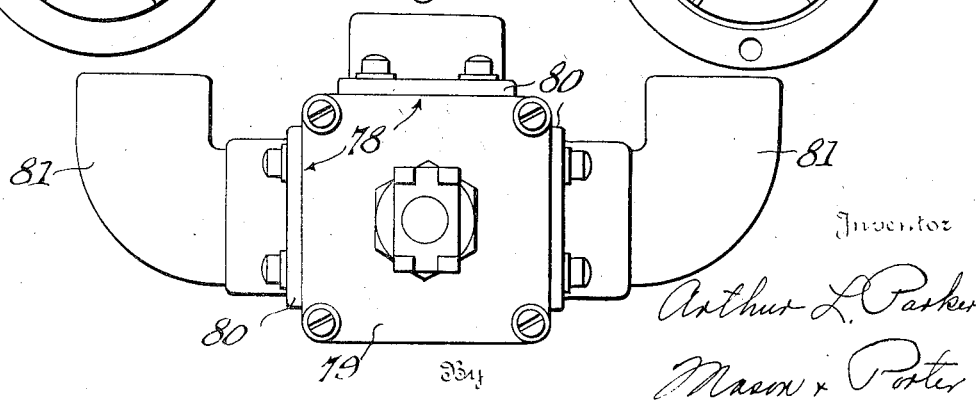

Patented Feb. 8, 1944

2,341,330

UNITED STATES PATENT OFFICE 2,341,330

DISTRIBUTING VALVE

Arthur L. Parker, Cleveland, Ohio, assignor to The Parker Appliance Company, Cleveland, Ohio, a corporation of Ohio Application February 7, 1940, Serial No. 317,768

5 Claims. (Cl. 251—144)

The invention relates generally to distributor valves of the type wherein means is provided for selectively receiving fuel or the like from one or more sources and distributing it to one or more places of use, and it primarily seeks to provide a novel valve structure of this character including individually mountable and removable poppet valve units.

The invention further relates a valve structure of the character stated in which is included a casing having a fuel receiving chamber therein and a plurality of valve unit mounting stations, a valve unit of the poppet type removably mountable on each station and including a removably mounted valve seat and spring seated valve structure and novel means for removably securing the valve seat and valve in place therein and for sealing the unit against leakage past the seat or through the individual mounting, and means for selectively unseating the valves.

An object of the invention is to provide a novel valve structure of the character stated in which the unit sealing means includes a gasket ring engageable with the valve seat member and with the main casing within an annular groove with which the ring is removably clamped against protrusion.

Another object of the invention is to provide a novel poppet type valve unit readily mountable on or removable from the main valve casing and which includes a valve member and valve seat combination removable as a unit from said unit.

With the above and other objects in view that will hereinafter appear, the nature of the invention will be more fully understood by following the detailed description, the appended claims, and the several views illustrated in the accompaying drawings.

In the drawings:

Figure 1 is an end elevation illustrating a distributing valve emboying the invention, parts being broken away and in section.

Figure 5 is an enlarged fragmentary section illustrating the positioning of one of the valve plate and valve unit mount sealing gaskets, the relaxed condition of the gasket being shown.

Figure 6 is a view similar to Figure 5 and illustrates the position of the parts when the valve is secured on its mounting.

Figure 7 is a detailed vertical cross section illustrating a modified form of casing end closure and mounting plate.

Figure 8 is a fragmentary vertical longitudinal section illustrating a modified form of cam adapted for simultaneously effecting the opening of two poppet valves.

Figures 9, 10 and 11 are fragmentary sectional views respectively illustrating modified forms of valve units.

Figure 12 is a face view of an actuator cam and illustrates a checking recess in the hub portion thereof.

Figure 13 is a face view of the check plate which engages the cam hub.

Figure 14 is an end elevation illustrating a modified form of the distributing valve.

Figure 2:
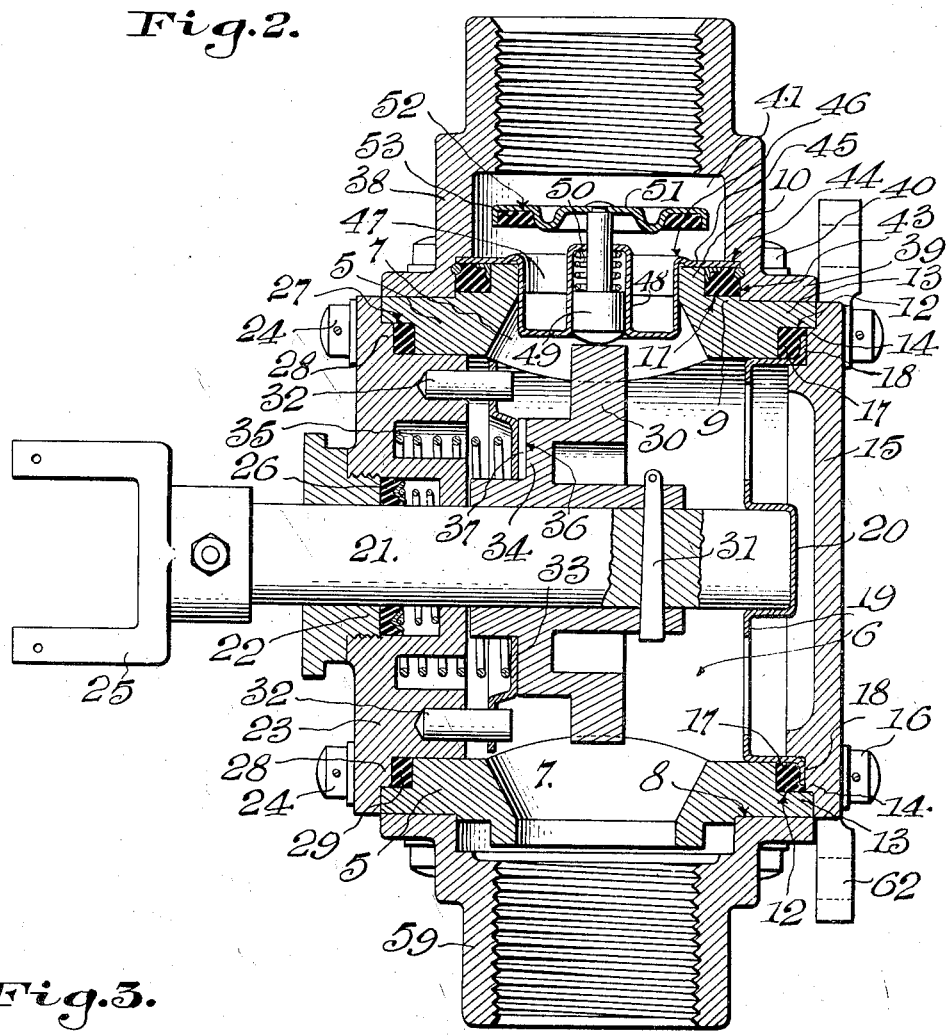
Figure 2 is a vertical cross section taken on the line 2—2 on Figure 1.
Figure 3:
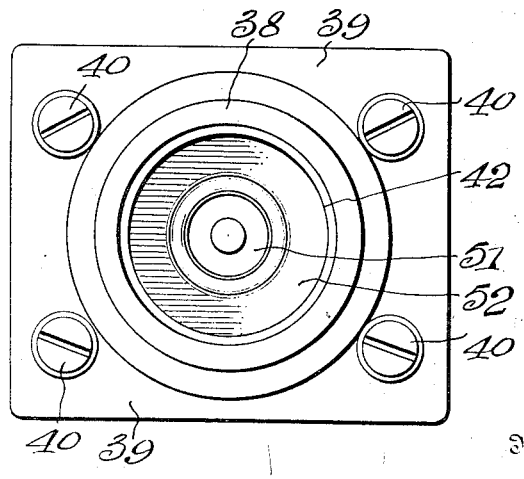
Figure 3 is a plan view of one of the removable valve units.
Figure 4:
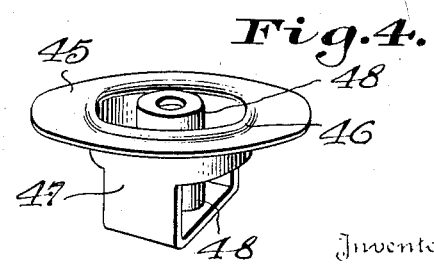
Figure 4 is a detailed perspective view of one of the valve seat plates.

In the example of embodiment of the invention herein disclosed, there is included a valve casing or ring 5 which is open at its ends and provides a central cavity 6 surrounded by five radially directed distributor openings 7 formed in the five identical facets 8 provided exteriorly of the casing.

Each of the facets 8 includes a circular centering boss 9 and an outwardly extended distributer opening defining flange 10. This boss and flange arrangement provides an annular seat 11 surrounding each distributor opening 7.

A counterbore at one end of the casing provides a gasket seat 12 and a centering flange 13 for receiving a centering boss 14 projecting inwardly from a closure and mounting plate 15 which is secured as at 16 to the casing. A gasket 17 is mounted on the seat 12, and an outwardly extended flange 18 of an apertured plate 19 is securely clamped between this gasket and the centering boss 14 of the closure plate.

The plate 19 carries a central bearing socket 20 for rotatably supporting an end of the actuator shaft 21 which extends through a packed gland 22 provided in the closure cap 23 secured as at 24 to the other end of the valve casing 5. The extended end of the shaft 21 has provision as at 25 for connection with any suitable actuating medium through which the desired rotary movement can be imparted to the shaft 21. A spring pressed gasket 26 is included in the gland 22.

A counterbore 27 in the casing end closed by the cap 23 receives the centering boss 28 projected inwardly from said cap, a suitable sealing gasket 29 being clamped between the cap and said casing end.

A cam 30 is secured as at 31 upon the shaft 21 with the effective cam body portion thereof disposed in the plane occupied by the axes of the multiple distributer openings 7. Pins 32 project into the valve cavity 6 from the closure cap 23 and serve to slidably support a check plate or ring 33, said plate or ring being yieldably pressed against the hub 34 of the cam by a compression spring 35 interposed between said ring or plate and the adjacent wall of the closure cap 23. In order to check the valve positions and determine the positioning of the cam rise or hub in proper engagement with a selected valve unit, the cam hub 34 is equipped with a plurality of recesses 36 which are equidistantly spaced and radially disposed for alignment with the respective distributer openings 7. One such recess is aligned with the crest or hump of the cam. The check plate carries detents 37 for yieldably engaging in the cam hub recesses, and by sensing the interengagement of these detent and recess equipments, the attendant of the plane or other unit of equipment with which the valve is associated can determine the position of the cam and the valve unit or units being opened and held open thereby. Obviously these detent and recess equipments will serve to hold the actuator cam in an adjusted position until the attendant changes this position by imparting a movement of rotation to the shaft 21.

A poppet valve unit is associated with each of the facets 8 and the distributer opening 7 formed therein, and each of these units is removably and replaceably attached to one such facet.

Each of these poppet valve units includes a tubular casing 38 having a mounting flange 39 adapted to be removably secured as at 40 to one of the casing facets 8. The casing 38 is shaped to provide a valve chamber 41 axially aligned with the associated distributer bore 7 and adapted to connect, through the reduced, internally threaded casing end 42, with a pipe line or conduit leading to the fuel tank or other source of liquid to be distributed through the valve casing 5. A counterbore 43 in the casing 38 is dimensioned to snugly fit the centering boss 9 projecting from the respective casing facet, and this counterbore forms a seat or abutment 44 for a valve seat plate 45. Each valve seat plate includes a raised seat rib 46 and a depressed spider 47 dimensioned to be snugly received within the upper terminus of the respective distributer opening 7. The spider supports an axially disposed bearing cup 48 in which a valve plunger 49 is reciprocably mounted, said plunger being yieldably depressed by a compression spring 50 coiled thereabout within said cup. At its upper end the plunger carries a valve plate 51 shaped to form a raised annulus groove 52 in which a seat-engaging gasket 53 is mounted.

It will be noted that the seat plate 45 and the reciprocable valve member 51 are joined as a poppet valve unit, and each such unit is removably held within its casing 38 by a split ring 54 removably mounted in a receiving recess 55 formed in the respective counterbore 43. A sealing gasket 56 is mounted in the counterbore 43 in contact with the seat plate 45, and it will be observed that the inner corner portion of the gasket opposed to the seat plate is reinforced by a metal angle ring 57. It will be noted also by reference to Figure 5 of the drawings that the inner and outer corners at the lower face of each gasket 56 are chamfered as at 58.

In Figures 5 and 6 of the drawings the relaxed and fully clamped conditions of the sealing gasket 56 are illustrated. It will be observed by reference to Figure 5 that when each valve unit is initially applied to the centering boss 9 projecting from the respective valve casing facet, the boss will effect its centering function or engagement in the counterbore 43 before any compression of the gasket 56 takes place. Thus, before the mounting screws are tightened to compress the gasket 56, the gasket is completely entrapped against protrusion by the wall of the counterbore 43, the reinforcing ring 57 and the face of the boss 9. The completely applied position of the valve unit casing, and the completely compacted condition of the gasket annulus 56, are illustrated in Figure 6 of the drawings.

In Figures 1 and 2 of the drawings, there is illustrated an arrangement of parts within which four poppet valve units are shown as removably affixed to the casing 5, and a fifth discharge unit is shown affixed to the remaining valve casing facet. This discharge unit 59 may be formed in the same manner as the valve unit casings except for the provision of the large chamber in which the poppet valve structure is removably mounted. In this arrangement the fuel or other liquid will be received through a selected one of the multiple of poppet valve units determined by engagement of the actuator cam with the valve plunger in the manner illustrated in said Figures 1 and 2, and the supply of liquid thus admitted will flow into the casing cavity 6 and out through the discharge unit 59.

If desired, a poppet valve unit may be applied to each of the five facets of the casing, and in such an arrangement of the invention the discharge throat may be formed as at 60 directly in a removable end closure plate 61 in the manner illustrated in Figure 7 of the drawings.

It will be observed by reference to Figures 1, 2 and 7 of the drawings that both forms of closure plates 15 and 61 can be equipped with mounting ears 62 for facilitating attachment of the distributer valve to the plane or other unit of equipment with which it is to be used.

In Figure 8 of the drawings there is diagrammatically illustrated a modified arrangement of the invention in which the actuator cam includes an actuator portion 63 of a length sufficient to simultaneously engage two of the poppet valve plungers. By use of such a cam an attendant can simultaneously open two of the poppet valve units.

When the improved distributer valve is to be installed in a plane, or in connection with other equipment similarly subject to vibrations, it may be found desirable to wire the mount securing screws of the valve unit and the closure plates in the manner illustrated at 64 in Figure 1 of the drawings so as to secure the mounting screws against loosening.

In Figure 9 of the drawings, there is illustrated a modified form of poppet valve unit. In this modified form of unit the casing is formed and mounted in the manner hereinbefore described, and the valve seat plate is formed and mounted in substantially the same manner. It will be noted, however, that the reciprocable valve member is in the form of a flat plate 65 having its edge portion turned downwardly to receive the seating disk 66 of rubber or other suitable yieldable material. An apertured abutment plate 67 is disposed above the valve plate 65 in abutting relation with the shoulder 68 formed by the upper extremity of the valve chamber within the casing 69. A compression spring 70 is interposed between the abutment plate 67 and the valve plate 65 and serves to yieldably hold the valve seated with its actuator plunger projected below its center bearing in position for being engaged by the actuator cam.

In Figure 10 there is illustrated another modified form of valve unit which is generally the same as the first described unit except for the fact that the central bearing portion is extended upwardly an additional distance as at 71, and the valve member is upwardly cupped as at 72 to receive this upward extension of the bearing member. In this manner a relatively long valve seating spring can be provided and a relatively long bearing for the valve plunger is provided.

In Figure 11 of the drawings there is illustrated an additional modification of the valve unit in which the central bearing 73 is made larger than in the other forms, and the small diameter valve plunger 74 has a cupped enlargement 75 pin-secured thereon as at 76 so as to receive the relatively long compression spring 77.

In Figure 14 of the drawings a modified form of distributer valve is illustrated in which the valve casing includes four unit mounting facets 78 instead of five as illustrated in Figures 1 and 2. As in the form previously described, this casing has its open ends closed by closure plates 79. The valve units are removably mounted by having their mounting flanges 80 screw-secured to the mounting facets, and in this form of the device certain of the units may include elbow extensions 81, if desired, so that the internally threaded fuel receiving throats thereof can all be directed in the same way, as is illustrated in Figure 14, or in other selected directions. It is to be understood that for such installations the mounting screw holes are equidistantly spaced about an imaginary circle, that is, disposed so that each hole will lie on a 45° line passing through the center of the port served by the particular valve unit, so that the elbows can be mounted interchangeably and each directed in any one of four different positions on any given valve casing facet.

In operation, the distributer valve is mounted with each of the valve unit casing receiving throats 42 connected with an individual tank or source of supply, and with its discharge throat 59 connected to the motor or motors, or other apparatus to be served through the distributer valve from the selective supply source.

By applying movement about its axis to the actuator shaft 21 the cam 30 can be positioned to open any selected one of the poppet valves and can be yieldably held in this adjusted position by the recess and detent equipments 36, 37 hereinbefore described.

It is of course to be understood that the details of structure and arrangement of parts may be variously changed and modified without departing from the spirit and scope of my invention.

I claim:

1. In a distributer valve including a main casing and an inlet opening therefor; an individual valve unit removably and replaceably mounted over said inlet opening and including a unit casing having a valve chamber bore therein and a counterbore forming a valve seat plate abutment, a seat plate engaging said abutment and including a valve seat and a central bearing cup aligned with said inlet opening, a valve member engageable with the seat in the valve chamber and having a plunger slide guided in the bearing cup and projecting into the main casing, and spring means normally holding the valve member on its seat.

2. In a distributer valve including a main casing and an inlet opening therefor; an individual valve unit removably and replaceably mounted over said inlet opening and including a unit casing having a valve chamber bore therein and a counterbore forming a valve seat plate abutment, a seat plate engaging said abutment and including a valve seat and a central bearing cup aligned with said inlet opening, a valve member engageable with the seat in the valve chamber and having a plunger slide guided in the bearing cup and projecting into the main casing, and spring means normally holding the valve member on its seat; said main casing having a centering boss surrounding said inlet opening and receivable in the counterbore of the valve unit casing; a gasket in said unit casing counterbore engaged with said centering boss and seat place and effective to prevent leakage past said boss and plate.

3. In a distributer valve including a main casing and an inlet opening therefor; an individual valve unit removably and replaceably mounted over said inlet opening and including a unit casing having a valve chamber bore therein and a counterbore forming a valve seat plate abutment, a seat plate engaging said abutment and including a valve seat and a central bearing cup aligned with said inlet opening, a valve member engageable with the seat in the valve chamber and having a plunger slide guided in the bearing cup and projecting into the main casing, and spring means normally holding the valve member on its seat; said main casing having a centering boss surrounding said inlet opening and receivable in the counterbore of the valve unit casing and an upstanding seat plate abutting flange defining the respective inlet opening; a gasket in said unit casing counterbore engaged with said centering boss and seat plate and effective to prevent leakage past said boss and plate; said flange being shallower than said unit casing counterbore and said gasket having a metal confining corner ring engageable with said flange and seat plate whereby said gasket will be completely confined against protrusion between the seat plate and flange and also between the unit casing and the centering boss.

4. A valve unit comprising a seat plate including a valve seat and a central bearing cup, a valve member engageable with the seat and having an actuator plunger slide guided in the bearing cup and projecting through said cup, spring means surrounding the plunger in the cup and effective to yieldably hold the valve member on said seat, a unit casing having a chamber bore in which said valve member is operable and a counterbore providing an abutment for positioning said seat plate, and a split ring removably securing the seat plate against said abutment.

5. A valve unit comprising a seat plate including a valve seat and a central bearing cup, a valve member engageable with the seat and having an actuator plunger slide guided in the bearing cup and projecting through said cup, spring means surrounding the plunger in the cup and effective to yieldably hold the valve member on said seat, a unit casing having a chamber bore in which said valve member is operable and a counterbore providing an abutment for positioning said seat plate, a sealing gasket in said counterbore, and mounting means for said unit casing including a boss insertible in the counterbore and against the gasket for compressing said gasket so that it seals the seat plate and also the unit casing mounting against leakage.

ARTHUR L. PARKER.